Nov. 17, 1931.                    E. H. COOPER                    1,832,766
                                  BRAKE SHOE KEY
                                Filed Nov. 29, 1929
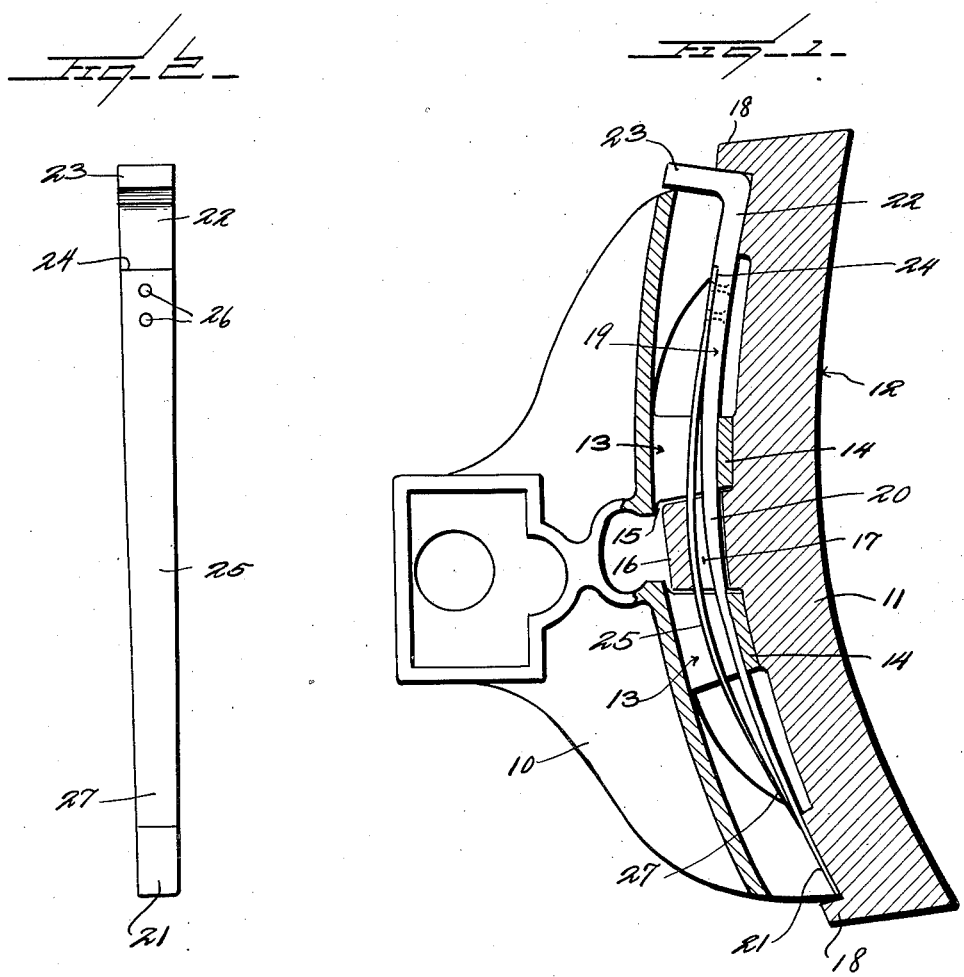
Inventor
E. H. Cooper
By Watson E. Coleman
Attorney Patented Nov. 17, 1931

1,832,766

UNITED STATES PATENT OFFICE

EMORY H. COOPER, OF ST. LOUIS, MISSOURI

BRAKE SHOE KEY

Application filed November 29, 1929. Serial No. 410,596.

The present invention relates to brake shoe keys and has for an important object thereof the provision of a brake shoe key which is adapted to be inserted between the brake head and the brake shoe for securely holding the brake shoe on the brake head.

Another object of this invention is to provide a device of this character which will not only prevent the loss of the brake shoes but will effect an economy in the wear and tear on the brake head.

A further object of this invention is to provide a device of this character which is adapted particularly for use on brakes which have been in use for a considerable length of time and wherein the brake head and the brake shoe have been subjected to extremely hard usage, the device being adapted to render unnecessary the replacement of either the brake head or the brake shoe or both, thereby effecting a considerable economy in the repair or reconstruction of the brake mechanism.

The above and various other objects and advantages of this invention will in part be described in and in part be understood from the following detailed description of the present preferred embodiment, the same being illustrated in the accompanying drawings wherein:—

Fig. 1 is a side elevation partly in section of a device constructed according to the preferred embodiment of this invention; and Fig. 2 is a detail front elevation of the device.

Referring to the drawings wherein like numerals of reference designate corresponding parts throughout the several views, the numeral 10 designates generally a brake head which is of conventional construction and which is adapted to be mounted on the braking mechanism of a railway car or the like.

A brake shoe 11 is adapted to be mounted on the outer end portion of the brake head, the brake shoe 11 being arcuately formed at the outer end portion as at 12 so as to bear against the periphery of the car wheel. The brake head 10 is provided with an arcuately inclined opening 13 adjacent the forward end thereof which extends through forwardly extending lug members 14 which are of conventional type. The brake head 10 may also be provided with a central slot or groove 15 which is adapted to receive an outstanding lug member 16 mounted on the brake shoe.

The outstanding lug member 16 is provided with an opening 17 therethrough, and the opposite end portions of the shoe 12 are preferably provided with outstanding lug members 18 which are adapted to engage therebetween the opposite end portions of the brake head for preventing circumferential movement of the shoe with respect to the head.

A brake shoe key, generally designated as 19, is adapted to be mounted in the openings 13 of the brake head and extend through the opening 17 of the brake shoe. The key 19 is preferably constructed of metal which is properly tempered and is arcuately formed so as to substantially conform to the segmental configuration of the brake shoe.

The key 19 is provided with a tapering body portion 20, the lower end of the key being relatively thin as at 21, and the upper end of the key being substantially thick in cross section as at 22. The upper end of the key is preferably bent outwardly as at 23 so as to facilitate pulling of the key out of the key-way 13 in the brake head when it is desired to remove the key therefrom. The key 19 is provided with a notch or recess 24 spaced downwardly from the upper end thereof, and a resilient spring or locking member 25 is mounted at the upper end thereof in the recess portion 24 of the key in any desirable manner but in the present preferred embodiment the upper end of the yieldable member 25 may be secured to the key by a plurality of rivets 26 or the like.

The spring member 25 is preferably positioned on the body of the key 19 in bowed relation thereto, the central portion of the spring being positioned in spaced relation to the body of the key, and the lower end portion of the spring is adapted to engage against the body of the key spaced upwardly from the lower end thereof.

The lower end 27 of the key is preferably restricted or reduced so that when the central portion thereof is forced against the body 20 of the key, the key 19 may readily be positioned in the key-way 13 of the brake head.

Through the provision of the resilient member 25, the brake shoe 11 will be firmly held on the brake head 10 and when, through excessive wear or hard usage, the key-way 13 on the brake head and the opening 17 in the brake shoe become enlarged, the spring or yieldable member 25 will securely hold the brake shoe against movement with respect to the brake head.

The spring or yieldable member 25 is also constructed so as to securely retain the key 19 in the key-way due to the resilient structure of the spring so that it will not be necessary to include in the construction of a key member of this type any means for locking the key in the key-way.

In the devices at present in use, numerous methods have been devised for locking the key on the brake head but none of these devices includes the provision of means for taking up the wear and tear on the brake head due to the hard usage to which the brake shoe is subjected.

While an ordinary key positioned in the key-way 13 will hold the brake shoe on the brake head when the key-way 13 in the brake head and the key-way 17 in the brake shoe become enlarged, no provision has heretofore been made for taking up this wear and tear.

Through the provision of the resilient key member herein disclosed, the key 19 will not only be retained in proper position on the brake head but should the key-way in the brake head and in the brake shoe become enlarged through extremely hard usage, the resilient member 25 will securely hold the brake shoe on the brake head against relative movement.

The key 19 is particularly designed for use in brake heads on cars wherein the brake shoe is somewhat loosely held on the brake head, and through the use of this key it will not be necessary to insert a new brake head and break shoe on the car which is under repair.

In the use of this device the restricted end portion 21 of the key 19 is inserted in the key-way and by means of a hammer or other device, the head 23 of the key may be forced downwardly toward the brake head until it rests substantially against the upper portion of the brake head. Due to the thin or knife-like edge portion 27 of the resilient member 25, the spring member 25 is tensioned in the key-ways 13 and 17, and when the key 19 has been properly positioned, the tensioning member 25 will firmly hold the brake shoe 11 on the brake head.

It will, of course, be understood that various changes and modifications may be made in the details of construction and design of the above specifically described embodiment of the invention without departing from the spirit thereof, such changes and modifications being restricted only by the scope of the following claim.

What is claimed is:—

A brake shoe key of the character described comprising an elongated arcuately inclined key member, releasing means secured to the upper end of said key, said key having a recessed portion spaced downwardly from the upper end thereof, and resilient securing means mounted on said key, said resilient securing means being secured at one end to said key in said recess, the body of said resilient member being tapered toward the free end thereof whereby to permit insertion of the resilient member in the key-way of the brake head and brake shoe.

In testimony whereof I hereunto affix my signature.

EMORY H. COOPER.